United States Patent

Miodownik et al.

[19]

[11] Patent Number: 5,845,195
[45] Date of Patent: Dec. 1, 1998

[54] DIGITAL RADIO FREQUENCY COMMUNICATIONS DEVICE FOR INSERTION INTO FLOPPY DISKETTE DRIVE

[76] Inventors: Saul Miodownik, 367 Coolidge St.;
Barry Leon, 326 Linden Pl., both of West Hempstead, N.Y. 11552

[21] Appl. No.: 683,591

[22] Filed: Jul. 17, 1996

[51] Int. Cl.$^6$ .............................. A01F 7/06; B02B 3/06; G11B 5/54; G11B 3/70

[52] U.S. Cl. .......................... 455/66; 360/105; 360/129; 360/133; 360/135; 455/88; 455/90; 455/74; 455/556; 455/557; 369/273

[58] Field of Search .............................. 348/825.54, 722; 235/375–382.5; 385/216, 226; 360/110, 131–132, 105, 135, 129; 386/46, 1, 45, 125; 455/88–90, 74, 66; 369/272, 273

[56] References Cited

U.S. PATENT DOCUMENTS

| | | | |
|---|---|---|---|
| 4,359,762 | 11/1982 | Stollorz | 360/98 |
| 4,665,519 | 5/1987 | Kirchner et al. | 370/375 |
| 4,696,831 | 9/1987 | Sakaguchi et al. | 427/48 |
| 4,794,470 | 12/1988 | Lauffenburger et al. | 360/69 |
| 5,001,700 | 3/1991 | Rowden et al. | 369/270 |
| 5,135,095 | 8/1992 | Kocznar et al. | 194/209 |
| 5,412,522 | 5/1995 | Lockhart et al. | 360/97.01 |
| 5,446,707 | 8/1995 | Arakik | 369/13 |
| 5,628,055 | 5/1997 | Stein | 455/89 |

OTHER PUBLICATIONS

Prototype of an indoor high speed diffuse ... Lu, H.K. et al. Singapore ICCS '94, vol. 1 pp. 338–342.
Wireless Data Communications, Russo, R.R. Communications on the Move pp. 432–436 vol. 2.
Circuit based data transport for a wireless access communications System; Chang, L.F. et al. 2nd Intn'l pp. 754–758 vol. 2.
Panasonic product literature, CF–V21P, May 1994 and Oct. 31, 1995.
BreezeCom Wireless Modem no date, Jun. 1997.

Primary Examiner—Douglas W. Olms
Assistant Examiner—David R. Vincent
Attorney, Agent, or Firm—Michael A. Adler; Cobrin Gittes & Samuel

[57] ABSTRACT

The present invention relates to a wireless apparatus for transferring information between computers. The communication device uses a diskette that transmits and receives information by using radio frequency. The diskette includes receiving and transmitting circuitry which is used in conjunction with software to facilitate the file transfer.

10 Claims, 1 Drawing Sheet

DIGITAL RADIO FREQUENCY COMMUNICATIONS DEVICE FOR INSERTION INTO FLOPPY DISKETTE DRIVE

FIELD OF INVENTION

The present invention generally relates to an apparatus for transferring information between at least two computers, and more particularly, the invention relates to an apparatus for transferring information between computers via radio frequency signals without requiring access to RS-232 ports or parallel ports.

BACKGROUND OF THE INVENTION

Personal computers (PC's) have become enormously popular and useful since their first commercial introduction in the early 1980's. The pervasive use of computers has necessitated a demand for an efficient approach to transfer information, data and/or files between or among PC's and particularly between free-standing modules or laptops. It is often highly desirable and efficient to transfer a block or portions of a block of files between two computers directly without the necessity of having to copy files to and from diskettes and/or CD-Roms and the like. Such direct transfer of data, such as complete blocks of files, is particularly helpful when upgrading computer software or when there is a need to transfer substantial amounts of data between computers where the alternative of copying from diskettes would require a long period of time or is simply too unwieldy.

Many communication links that are currently adapted to transfer data between computers require direct cable connections between them. The direct cable connection often uses RS-232 ports or parallel ports that are located behind the central processing units of the computers that will be communicating, that is, transferring information. Such direct link communication formats typically have associated software to control the transmission of such data. By way of example, LAPLINK™ is a well-known example of a direct communication link which requires a direct cable hook-up between two communicating computers where such hookup uses RS-232 ports. In addition to the direct cable hook-up, LAPLINK™ also has associated software to facilitate such data transfer.

The direct cable hook-up mode of transferring data between computers suffers the drawback that it uses at least one RS-232 port or parallel port in each of the communicating computers. This often requires redesignating the COM ports or parallel ports as presently defined, disconnecting various devices that may be connected to the ports which now must be used for the direct cable hook-up. This set-up may even require dismantling attachments to the computers in order to access the RS-232 ports or parallel ports or bringing the computers in proximity with each other within the confines of the length of the cable.

Another drawback relates to the manufacturing costs of the direct cable hookup. This set-up requires a cable with two hook-ups and an associated software program, often furnished via diskette. The cost of providing both the cable and the diskette adds to the expense for the end user.

There are some available forms of wireless communication links that allow for the transfer of data between computers. These modes typically use infrared technology. One limitation is that the two communicating computers between which the transfer will occur must be facially adjacent or must have relatively specific spatial orientations for the proper transmission and receipt of the infrared waves. U.S. Pat. No. 4,665,519 proposes a wireless modem for communications between computers, terminals and other peripheral computer equipment. This wireless modem, however, still requires using RS-232 ports and access to the COM ports of the PC.

Accordingly, it is an object of this invention to allow for the transfer of data between computers without using the RS-232 ports.

It is also an object of this invention to allow for the transfer of data between computers without requiring access to areas behind the CPU of the communicating computers.

It is also an object of this invention to allow for the transfer of data between computers without requiring specific orientations between the communicating computers and further without generally being limited by the length of cables or other hardware attached to the computers and between them.

It is also an object of this invention to allow for the transfer of data at varied distances and orientations.

It is also an object of this invention to provide for the transfer of data using technology other than infra-red waves.

It is also an object of this invention to provide an alternate bidirectional data transfer system that is cheaper to manufacture.

It is also an object of this invention to enable the transfer of information between computers, terminals, and other peripheral computer equipment.

SUMMARY OF THE INVENTION

In keeping with these objects and others which will be apparent hereinafter, one feature of the invention resides, in a diskette which uses digital radio frequency transmission to transfer data from one computer to at least one other computer or other peripheral equipment. The diskette includes receiving and transmitting circuitry which is used in conjunction with software to facilitate the file transfer.

To initiate transmission of data between two computers, the user must first establish a communication link between the two communicating computers. This is accomplished by associated software which first establishes and confirms that both computers are ready, that is, one is ready to receive and the other is ready to transmit. In order to initiate the process of data transfer, the diskettes containing the devices of this invention are inserted in the corresponding diskette drives of two computers. Software resident in both computers commands the diskette drive read/write head to align itself with a similar read write head contained within the radio frequency transfer diskette. When these two sets of read/write heads are so aligned they effectively comprise a transformer that allows signals to pass in both directions; either from the RF diskette to the computer containing the diskette drive or viceversa. After initial establishment of communication readiness has been confirmed, the software begins to command the transmission of data in the transmitting computer ultimately to be received by the receiving computer or peripheral. The details of such communication software are well known in the art. Thus, a description of this type of communications software is not deemed necessary for the understanding and enablement of this disclosure.

DETAILED DESCRIPTION OF THE INVENTION

Figure 1:
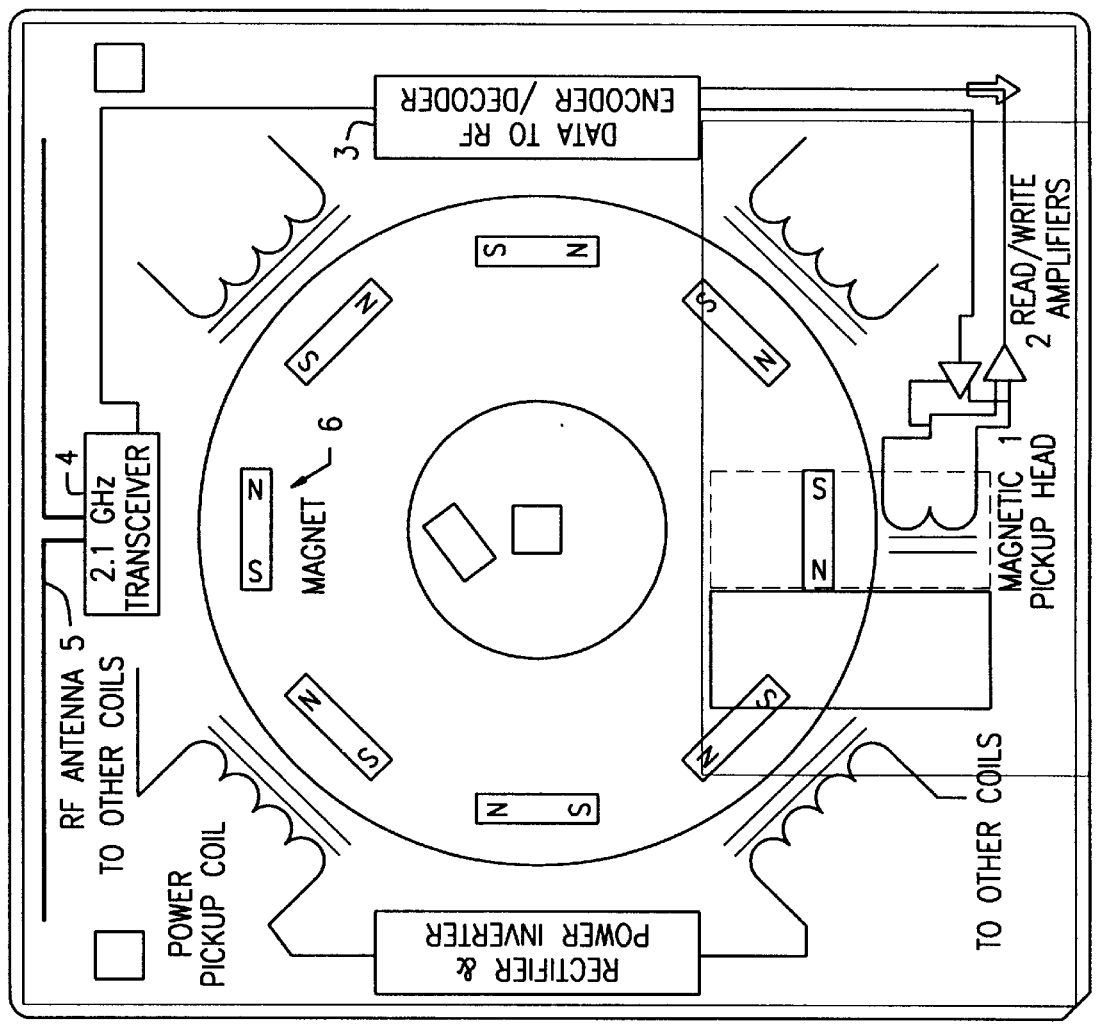
FIG. 1 is a diagram of the bidirectional communications device of the present invention.

Referring to FIG. 1, the diskette has a magnetic read/write head 1 built into the diskette drive housing 7. Data to be transferred is transmitted by the computer to the diskette drive containing the apparatus of the present invention where it is read from the diskette drive by read/write head 1. Specifically, the diskette housing is inserted in the diskette drive of the transmitting computer. Software resident in the computer commands the diskette drive read/write head of the transmitting computer to align itself with the read write head contained in the diskette housing. When the two read/write heads are aligned, they effectively comprise a transformer that allows signals to pass in both directions either from the RF diskette to the computer containing the diskette drive or vice-versa. After initial establishment that communication readiness has been confirmed, the software begins to command the transmission of data in the transmitting computer ultimately to be received by the receiving computer. This data is sent through an amplifier(s) 2 to a data recovery area where the data is encoded by digital encoder/decoder 3. The digital data is sent to a transceiver 4 containing a modulator for converting the digital data into a radio frequency signal and then coupled to a dipole strip antenna 5 for transmission to a receiving computer or peripheral.

The receiving of information takes place in an analogous, but opposite fashion. Receiving information is accomplished by using a dipole strip antenna for receiving RF transmissions, at about the 2.4 GHz range. The same antenna may be used for transmitting and receiving. Such signals are directed to an RF receiver which directs the RF waves into transceiver 4 having a demodulator for converting the radio waves into digital signals. Such digital signals are decoded by the decoder 3 and then amplified by amplifier 2. Thereafter, the amplified digital signal travels to the read/write head 1 of the diskette where it is written into the memory of the computer or peripheral. The receiving computer then instructs the reading of data as it would from any other form of diskette.

This device requires a minimum power voltage source in order to be operative. This can be self-generated with a multiple voltage generator comprised of a plurality of magnets 6 preferably arranged in a circular fashion. The magnets are embedded in a disk of plastic material that resides in the housing of the communication device. The plurality of magnets are rotated (spun) by the diskette drive mechanism of the computer or peripheral. There are associated fixed pick up coils located at a fixed position relative to the rotating plurality of magnets. As the magnets rotate or spin, the pick up coils induce an AC voltage within the pick up coils. A rectifier and inverter are operatively connected to the pick up coils and convert the AC voltage into DC voltage sufficient to power the communications device.

What is claimed is:

1. A communications device for wireless transmission of data between computers or related devices, said communications device comprising;

an antenna;

a diskette housing configured for insertion into a diskette drive of a computer;

a read/write head integral to said diskette housing for receiving and transferring data from the diskette drive of the computer and converting said data into a first signal in an encoder/decoder;

a modulator operatively connected to the encoder/decoder connected to the read/write head for transforming said first digital signal into a first radio-frequency signal; and a radio-frequency transmitter operatively coupled to said modulator for wireless transmission of said first radio-frequency signal via said antenna.

2. The communications device of claim 1 further comprising:

a radio-frequency receiver coupled to said antenna for receiving a second radio-frequency signal;

a demodulator operatively connected to said receiver for transforming said second radio-frequency signal into a second digital signal; and said read/write head being further coupled to said encoder/decoder for converting said second digital signal into data for writing to said read/write head.

3. The communications device of claim 1 wherein said diskette housing includes, said read/write head, said modulator, said radio-frequency transmitter and said antenna.

4. The communications device of claim 3 wherein said diskette housing is identical in shape and size to a conventional 3.5" inch high-density floppy diskette.

5. The communications device of claim 2 further comprising a diskette housing containing said read/write head, said demodulator, said radio-frequency receiver and said antenna.

6. The communications device of claim 1 wherein said first radio-frequency signal is about 2.4 Gigahertz.

7. The communications device of claim 2 wherein said second radio-frequency signal is about 2.4 Gigahertz.

8. The communications device of claim 1 wherein said antenna is a dipole strip antenna.

9. The communications device of claim 3 wherein said diskette housing contains a disk of plastic material having an embedded plurality of magnets for rotation by a diskette drive mechanism;

a plurality of pick up coils that are fixed with respect to said plurality of magnets whereby an A-C voltage is induced in said pick up coils as said plastic disk is rotated;

a rectifier and converter operatively connected to said pick up coils for converting said AC voltage into a DC voltage sufficient to power said communications device.

10. A wireless communications system for wireless transmission of data between computers or related devices, said system comprising:

a diskette housing further comprising a first communications device comprising a first antenna;

a first read\write head for reading said data from a diskette drive of a computer and converting said data into a first digital signal;

a modulator connected to said first read\write head for transforming said first digital signal into a radio-frequency signal; and a radio-frequency transmitter operatively coupled to said modulator for wireless transmission of said radio-frequency signal via said first antenna; and a second communications device comprising a second diskette housing comprising a second antenna;

a radio-frequency receiver coupled to said second antenna for receiving said radio-frequency signal;

a demodulator connected to said radio-frequency receiver for transforming said radio-frequency signal into a second digital signal; and a second read/write head coupled to said demodulator for converting said second digital signal into data for transfer to a read/write head of a second computer;

said first communications device located in a first computer in which said data to be transferred is located;

said second communications device located in said second computer in which said data is to be transferred to.

* * * * *